United States Patent
Coleman

(10) Patent No.: US 6,727,941 B1
(45) Date of Patent: Apr. 27, 2004

(54) UNIVERSAL DIGITAL CAMERA CONTROLLER WITH AUTOMATIC IRIS TUNING

(75) Inventor: Jeffrey L. Coleman, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 824 days.

(21) Appl. No.: 09/642,743

(22) Filed: Aug. 18, 2000

(51) Int. Cl.⁷ .................. H04N 5/228; H04N 5/232
(52) U.S. Cl. .................... 348/222.1; 348/347
(58) Field of Search .................. 348/222.1, 224.1, 348/231.99, 231.3, 231.6, 231.7, 240.99, 240.3, 335, 340, 345, 347, 348, 349, 357, 360–364; H04N 5/228, 5/232

(56) References Cited

U.S. PATENT DOCUMENTS

| | | | |
|---|---|---|---|
| 4,829,382 A | * 5/1989 | Hess et al. | 348/364 |
| 5,049,997 A | * 9/1991 | Arai | 348/364 |
| 5,260,795 A | 11/1993 | Sakai et al. | |
| 5,402,170 A | 3/1995 | Parulski et al. | |
| 5,406,349 A | * 4/1995 | Takahashi et al. | 396/257 |
| 5,475,441 A | 12/1995 | Parulski et al. | |
| 5,543,885 A | * 8/1996 | Yamano et al. | 396/300 |
| 5,675,358 A | 10/1997 | Bullock et al. | |
| 5,754,227 A | 5/1998 | Fukuoka | |
| 5,815,205 A | 9/1998 | Hashimoto et al. | |
| 5,877,811 A | * 3/1999 | Iijima et al. | 348/375 |
| 5,892,543 A | * 4/1999 | Zheng et al. | 348/347 |
| 6,005,613 A | 12/1999 | Endsley et al. | |
| 6,407,774 B1 | * 6/2002 | Mabuchi et al. | 348/335 |

* cited by examiner

*Primary Examiner*—Ngoc-Yen Vu
(74) *Attorney, Agent, or Firm*—Peter A. Lipovsky; Michael A. Kagan; Celia C. Dunham

(57) ABSTRACT

A camera controller incorporates a microcontroller for carrying out all controller functions. The microcontroller is operably coupled to a reprogrammable memory in which operating commands for the specific camera being used are stored. Thus the microcontroller can be configured to work with a great number of different cameras and command sets, based upon the specific camera being used. A memory that can be used for this purpose is an electrically erasable read only memory that, by using a programmable logic array and random access memory, can be reprogrammed in-place. The microcontroller is operably connected to a camera's "on/off", zoom and focus functions so that these may be controlled via the controller. Also controlled by the invention is the automatic iris feature of a digital camera.

1 Claim, 1 Drawing Sheet

UNIVERSAL DIGITAL CAMERA CONTROLLER WITH AUTOMATIC IRIS TUNING

BACKGROUND OF THE INVENTION

Technological advances have made it so that many American families and individuals can afford a digital movie camera. These cameras are being used more and more to capture images and then transfer these images via the Internet. Another use of the cameras is for surveillance purposes.

Digital cameras, with motor actuated zoom and focus capabilities, are rapidly becoming the camera of choice for a wide variety of surveillance applications. Many of these cameras come equipped with an automatic iris feature. The automatic iris function allows a selected amount of light to reach the image capturing element of the camera in a wide variety of light conditions. With this feature, image resolution is largely preserved though ambient light conditions may go from bright to dim and vice-versa.

Certain controllers are available for remotely operated video cameras. These controllers are invariably specific to the make and model of the camera and usually offer little capability to adapt to other camera designs. Regarding automatic iris functions, the controllers permit a remote operator to choose to activate or deactivate the function.

With technology ever-improving in the digital camera field, it becomes prudent and at times necessary to replace cameras being used for their more modern successors. In such cases, the remote controllers used with the cameras often will need to be changed and invariably those suited for the new cameras are unique to the camera purchased. The cost of supplying a new controller with each change could rapidly become prohibitive.

It is therefor desirable to have a digital camera controller that is adaptable to a wide-variety of digital cameras, foregoing the need to replace the controller with the acquisition of every new camera. Another desirable feature of such a controller is to provide a remote automatic iris control that is not limited solely to actuating or de-actuating the feature, but that allows a remote viewer to set the automatic iris feature to remain functional at a user-specified light level.

This latter feature will allow a user to accommodate scenes in which a bright object appears in a dark background, or a dark object appears in a bright background. Previous automatic iris functions did not readily accommodate these extremes. In surveillance applications, such tuning of the automatic iris can be crucial, as it can be envisioned that it headlights, flares or other focused light may temporarily blind the view of a remote observer who cannot adjust the iris.

There is thus a need for a digital camera controller that may be used with a wide variety of cameras and that permits the automatic iris function of those cameras to be fine tuned by a user of the camera controller.

SUMMARY OF THE INVENTION

The invention provides a camera controller incorporating a microcontroller for carrying out all controller functions. The microcontroller is operably coupled to a reprogrammable memory in which operating commands for the specific camera being used are stored. Thus the controller of the invention can be configured to work with a great number of different cameras and command sets, based upon the specific camera to be controlled. An example memory that can be used for this purpose is an electrically erasable read only memory that, by using a programmable logic array and random access memory, can be reprogrammed in-place. The microcontroller is operably connected to a camera's "on/off", zoom and focus functions so that these may be controlled via the controller. Also controlled by the invention is the automatic iris feature of a digital camera. An exemplary embodiment of the invention uses a multiplying digital-to-analog converter to control analog-formatted iris control devices. The controller is also designed to be used with cameras that utilize digital-formatted iris control devices. In either case, the controller of the invention permits its user to set the automatic iris to a user-specified light income level. The automatic iris will then strive to maintain the same degree of light exposure to its image collector according to this user-set adjustment. Additionally, the user may elect to activate or deactivate the iris control.

OBJECTS OF THE INVENTION

It is an object of this invention to improve remote camera control capability.

Another object of this invention is to provide a remote camera controller that can be used with a wide variety of cameras.

Yet another object of this invention is to provide a remote camera controller that controls motor-driven zoom and focus functions of the camera.

A further object of this invention is to provide a remote camera controller that permits control and tuning of an automatic iris feature of a camera so that the iris feature can be actuated or de-actuated and can also be set to remain functional to provide a user specified light income level to the image sensor of the camera.

Still a further object of this invention is to provide all of the above objects to digital cameras.

Other objects, advantages and new features of the invention will become apparent from the following detailed description of the invention when considered in conjunction with the accompanied drawing.

DESCRIPTION OF THE PREFERRED EMBODIMENT

Figure 1:
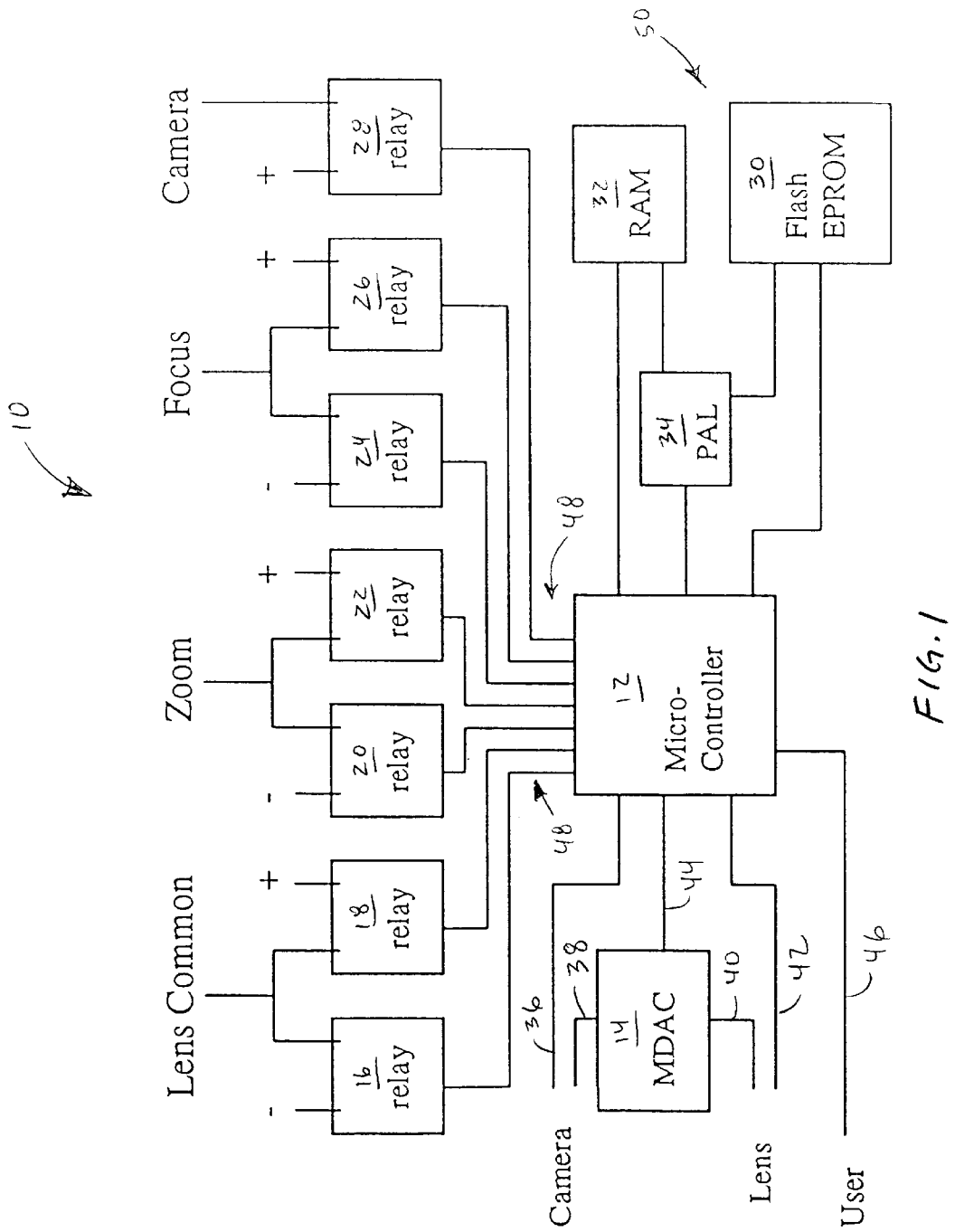
FIG. 1 illustrates an exemplary camera controller according to a representative embodiment of the invention.

FIG. 1 shows a representative embodiment of the invention. Referring to this figure, camera controller 10 includes a microcontroller 12, a multiplying digital-to-analog converter (MDAC) 14, seven solid-state relays 16–28, flash memory 30, random-access memory (RAM) 32, a programmable logic array (PAL) 34, and power and other standard devices for microcontroller operation and interface, not shown. In this example, microcontroller 12 has two serial interfaces and an integral analog-to-digital converter.

Commercial products that may be used for these components are, for example, a microcontroller available through Siemens as part number SAF-C517-LM, which is similar to the popular 8051 type of microcontroller. Multiplying analog-to-digital converter 14 is available through Analog Devices as part number AD8320. Relays 16–28 are solid state, available from International Rectifier as part number PVN012. Electrically erasable read only memory (EPROM) 30 is a flash memory available as AMD part number 29F010.

Random access memory 32 may, for example, be a Hitachi memory bearing part number HM62256BLPI-8. Programmable logic array 34, for example, is available through Vantis as part number PALCE16V8.

A camera that may be utilized with the invention is a Cohu Model 3522 color video camera with engineering revision ER4565HN. The camera uses the Cohu Model 3522-1000 DSP interline transfer CCD color camera with a ½ inch sensor, NTSC compatibility, and a 12-volt DC power supply. A suitable lens is a Cohu 160 millimeter, with motor-driven zoom and focus. Built-in potentiometers provide zoom and focus position feedback. A similar camera is the Cohu series 1300 camera identified as the Model 1310.

Though the above cameras are described by way of example, the invention is designed to be used with a great variety of makes and models of cameras.

Referring once again to the figure, a utilized camera will be connected to the invention via a number of operating lines. Line 36 is a serial port digital interface for connecting to a camera having a digitally formatted, such as pulse-width modulated, iris control function. In cases in which iris control functions are of analog format, line 38 provides an analog format output from the camera, for example, in the form of an amplitude-modulated video signal. Line 40 is an analog control line for sending user-specified analog commands to the analog format iris control of a camera fitted with these features. Line 42 provides lens potentiometer feedback of the zoom and focal length camera settings to microcontroller 12. Line 44 provides an interface between the MDAC 14 and microcontroller 12. Line 46 is a serial interface port into microcontroller 12 through which user-specified commands are entered into the microcontroller.

Used in conjunction with microcontroller 12 are relays 16–28 and appropriately coupled control lines (collectively identified as 48) from microcontroller 12 to the relays to provide a "lens common", zoom control, focus control and an "on-off" power capability to the camera. The EPROM 30, RAM 32 and PAL 34 are operably coupled to microcontroller 12 to provide the microcontroller with the command programming set for the camera that is used. As will be further discussed, PAL 34 is operably coupled to EPROM 30 and RAM 32 to permit "in-circuit" reprogramming of the EPROM.

Operation of the camera/controller 10 interface is performed by microcontroller 12 running firmware located in flash memory 30, or RAM 32 when under reprogramming conditions as will be explained. The microcontroller accepts operator commands via serial port 46 and issues camera commands via control lines 48 and serial port 36 in cameras that use digitally formatted control functions or via control lines 48 and control line 40 in cameras using analog formatted iris control functions.

Analog adjustment of a camera's automatic iris function is achieved by the insertion of MDAC 14 into the feedback loop between the camera and lens of an analog controlled camera iris function. Applying digital commands to MDAC 14 to vary the gain of the amplifying or attenuating stage of the iris feature has the effect of modulating the feedback signal strength. Increasing the gain will cause the iris to close, darkening the image, while decreasing the gain will cause the iris to open, making the image lighter. The automatic iris function will then continue to operate according to the user-set light adjustment.

In a camera having a digitally controlled iris feature, the camera's automatic iris is adjusted directly via digital commands sent from microcontroller 12 over control line 36. As with the analog adjusted iris, the user-specified commands are entered by way of control line 46, where these commands are converted by microcontroller 12 according to the camera's command set loaded into the memory 50 of controller 10.

The lens drive-motors are controlled by six relays, 16–26, which can apply positive or negative voltage to either the zoom or focus motor and to the lens common. Power to the camera can be switched on or off by microcontroller command through relay 28.

The microcontroller's operating program is stored as firmware in non-volatile flash electrically erasable programmable read only memory and can be modified remotely. This is accomplished by use of logic which switches the microcontroller to run out of volatile random access memory (RAM) during reprogramming. The microcontroller can reprogram flash memory 30 by copying its operating system to RAM 32, using PAL 34 to switch program and data memory access signals, and by then issuing erase and program commands to the flash memory.

This microcontroller uses a memory structure know to those skilled in the art as the "Harvard Architecture" wherein program and data memory share the same address. For added protection during programming, only the higher part of the flash chip is reprogrammed. The lower part is reserved for the basic reprogramming software. In case of error during reprogramming, the software is still able to run out of lower memory to accept instructions to reprogram the higher memory. An alternative in-system flash reprogramming is described in the Siemens Semiconductor application note, AP0821 "C5XX/80C5XX" In-System FLASH Programming". This approach can be found on the CDROM entitled "8-bit and 16-bit Microcontrollers CD-ROM Edition 2.0", Siemens Semiconductors, November 1997.

The advantage of allowing the Flash ROM to be reprogrammed by the microcontroller via remote control is that a camera's firmware can be easily modified without disassembly of the invention's hardware.

In summary, this invention provides wide flexibility as a remote camera controller. It uses a microcontroller with two serial interfaces to communicate simultaneously with a user and a camera. This allows translation of commands from one camera command set to another, so the invention can be made compatible with any digital camera with a serial interface and any user command set.

An alternative to the described example of the invention includes implementing the function of the MDAC using discrete components. Similarly, the analog-to-digital conversion function of the microcontroller may be performed by components external to the microcontroller. Multiple power supplies can be used to reduce the number of relays, and any type of electronic or mechanical switch can be used to perform the relay switching function.

Depending on the microcontroller interface employed, a wide variety of serial interfaces could meet RS232, RS422, or RS485 standards.

Obviously, many modifications and variations of the invention are possible in light of the above teachings. It is therefore to be understood that within the scope of the appended claims the invention may be practiced otherwise than as has been specifically described.

What is claimed is:

1. A control apparatus for a camera having an automatic iris control and motor-driven zoom and focus lens functions, wherein said lens functions respond to a particular program command-set, comprising:

a reprogrammable memory in which said particular program command-set of said camera is loaded, wherein said reprogrammable memory is reprogrammable in-circuit and includes an erasable programmable read-only-memory (EPROM), a random access memory (RAM) and a programmable logic array (PAL);

a microcontroller operably coupled to said memory; said microcontroller accessing operating code in said EPROM during a non-reprogramming mode of said EPROM and wherein said PAL shifts said operating code and said microcontroller access to said RAM from said EPROM during a reprogramming mode of said EPROM;

a zoom actuation switch operably coupled to said microcontroller and said motor-driven zoom function of said camera;

a focus actuation switch operably coupled to said microcontroller and said motor-driven focus function of said camera;

a multiplying digital-to-analog converter operably coupled to said microcontroller and to an analog-formatted automatic iris control of said camera, said multiplying digital-to-analog converter providing an analog control input signal to said analog-formatted automatic iris control based upon to a user-specified command so that said automatic iris control of said camera may be set at a user-specified light income level; and a user-command input operably coupled to said microcontroller wherein said user-command input corresponds to said particular program command-set of said camera so that said motor-driven zoom and focus functions of said camera and said automatic iris control of said camera is controllable by said user.

\* \* \* \* \*